United States Patent [19]

Tanaka et al.

[11] Patent Number: 4,546,265
[45] Date of Patent: Oct. 8, 1985

[54] FLASHER DEVICE FOR AUTOMOTIVE VEHICLE

[75] Inventors: Ryoichi Tanaka, Chita; Yasuhiko Sakurai, Kariya, both of Japan

[73] Assignee: Nippondenso Co., Ltd., Kariya, Japan

[21] Appl. No.: 563,870

[22] Filed: Dec. 21, 1983

[30] Foreign Application Priority Data

Dec. 22, 1982 [JP] Japan .................... 57-198363[U]

[51] Int. Cl.$^4$ ............................................. B60Q 1/38
[52] U.S. Cl. ........................... 307/10 CS; 307/10 R; 307/132 E; 200/61.27; 340/76; 340/81 R
[58] Field of Search ............ 807/10 R, 10 CS, 132 E, 807/132 EA, 132 M, 140; 200/61.27; 340/76, 81 R, 81 F

[56] References Cited

U.S. PATENT DOCUMENTS

| | | | |
|---|---|---|---|
| Re. 26,835 | 3/1970 | Almassy | 340/81 R X |
| 3,413,519 | 11/1968 | Leeder, Jr. | 307/132 E X |
| 3,444,515 | 5/1969 | Hayden | 340/81 R X |
| 4,284,974 | 8/1981 | Ishida et al. | 340/81 R |

Primary Examiner—A. D. Pellinen
Assistant Examiner—Derek S. Jennings
Attorney, Agent, or Firm—Cushman, Darby & Cushman

[57] ABSTRACT

A flasher device includes a printed circuit board enclosed in a casing, a B-terminal connected to a battery, an L-terminal connected to a direction indicating lamp, and an E-terminal connected to ground. A fixed contact of a relay section is attached to the L-terminal and a current detecting resistor is connected between the B-terminal and a movable contact of the relay section, so that a main lamp current flows from the battery to the lamp through the B-terminal, the current detecting resistor, the relay contacts and the L-terminal, thus avoiding the flow of main lamp current through copper foils formed on the printed circuit board.

10 Claims, 10 Drawing Figures

FLASHER DEVICE FOR AUTOMOTIVE VEHICLE

FIELD OF INVENTION

The present invention relates to an improvement in a flasher device for an automotive vehicle, which indicates turning of the vehicle to either the right or the left by turning on and off a direction indicating lamp mounted on the vehicle.

BRIEF DESCRIPTION OF PRIOR ART

A conventional flasher device will be explained with reference to FIGS. 1 and 2. FIG. 1 shows an electric wiring diagram of the conventional flasher device, while FIG. 2 shows a schematic sectional view of the device. In FIG. 1, numeral 9 designates a B-terminal fixed to a printed circuit board 20 at a terminal portion 20a and connected to a battery B, numeral 10 designates an L-terminal fixed to the circuit board 20 at a terminal portion 20f and which is connected to one of direction indicating lamps L by means of a direction switch S, and numeral 11 designates an E-terminal fixed to the circuit board 20 at a terminal portion 20g and which is grounded. Numeral 19 designates a current detecting resistor for detecting the disconnection of one of lamps L, which is mounted on the printed circuit board 20, the both ends of which are fixed thereto at terminal portions 20b and 20c, numeral 13 designates a relay coil of a relay section, both ends of which are fixed to the printed circuit board 20 at terminal portions 20h and 20i, and numerals 13/12 and 13/18 designate relay contacts of the relay section (numeral 13/18 is a movable contact to be attracted by an electromagnetic force produced by the relay coil 13 towards the fixed contact 13/12).

Since the circuit diagram of the printed circuit board 20, which includes copper foils thereon, is well known in the art, and is not directly concerned with the present invention, its description and an explanation of its operation has been omitted.

In FIG. 1, current flows from the battery B to one of the lamps L through the B-terminal 9, the copper foil 20j of the printed circuit board 20, the current detecting resistor 19, the copper foil 20k, the relay contacts 13/18 and 13/12, the copper foil 20l and the L-terminal 10, when the switch S is closed to one of the lamps L. Due to the fact that a large amount of electric current flows through the copper foils (20j, 20k and 20l) of the printed circuit board 20, a pattern space of the copper foils for the printed circuit board 20 should be made large enough to suppress heat generated by this large amount of current, which prevents the circuit board from being designed smaller and thereby results in a higher cost.

It is a further disadvantage of the above-explained conventional flasher device that the printed circuit board 20 requires a large number of terminal portions 20a to 20i (nine terminal portions), resulting also in a higher cost thereof.

The conventional flasher device will now be explained from another point of view with reference to FIG. 2. In FIG. 2, numeral 7 designates a casing made of synthetic resin for enclosing therein the printed circuit board (not shown) and the relay section. Numeral 8 designates a spool made of synthetic resin and having an upper flange 8f and a lower flange 8g. The lower flange 8g is enlarged to close an open end of the casting 7. Numeral 13 is a relay coil wound on the spool 8, numeral 14 designates a core inserted into a bore of the spool which fixes a yoke 15 at its lower and 14b. The yoke 15 is assembled to the spool 8 by inserting the same horizontally as seen from FIG. 2, and thereby a thickness T of the lower flange 8g must be designed larger.

SUMMARY OF INVENTION

It is therefore a primary object of the present invention to provide a flasher device for an automotive vehicle, in which a printed circuit board and its associated electric elements are so designed that the main current to a direction indicating lamp will not flow through copper foils formed on the printed circuit board, thereby allowing the accomplishment of a small-sized flasher device.

It is another object of the present invention to provide a flasher device for an automotive vehicle, in which a current detecting resistor is arranged at the opposite side of the relay section with respect to the printed circuit board, so that heat generated by the resistor may not influence the electrical elements mounted on the printed circuit board, such as an IC, a resistor and the like, to thereby obtain a reliable flasher device.

It is a further object of the present invention to provide a flasher device for an automotive vehicle, in which electrical elements, such as an IC, a resistor and the like are disposed in a space between a printed circuit board and a relay coil so that the whole space in the flasher casing can be effectively used, to obtain a small-sized flasher device.

It is a further object of the present invention to provide a flasher device for an automotive vehicle, in which all of the terminals are designed so that they are assembled to a spool axially thereof, whereby an assembling step by an automatic assembling machine is made simpler.

The above and other objects and features of the present invention will be made more apparent when the following description is read together with the accompanying drawings.

DETAILED DESCRIPTION OF PREFERRED EMBODIMENT

Figure 3:
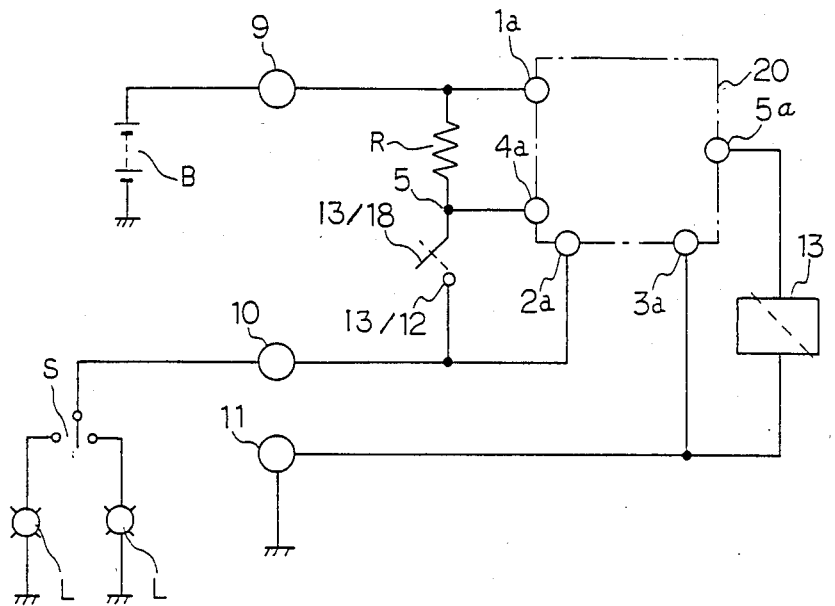
FIG. 3 is a schematic electric wiring diagram of a flasher device for an automotive vehicle according to the present invention.

In FIG. 3, numerals 9, 10 and 11 designate, respectively, a B-terminal connected between a battery B and a terminal portion 1a of a printed circuit board 20, an L-terminal connected between a direction indicator switch S and a terminal portion 2a of the printed circuit board 20, and an E-terminal connected at one end to ground and at the other end thereof to a terminal portion 3a of the printed circuit board 20 and to one end of a relay coil 13. The other end of the relay coil 13 is connected to a terminal portion 5a of the printed circuit board 20.

Numeral R designates a current detecting resistor connected at its one end to the B-terminal 9 and at its other end to a movable contact 13/18. The movable contact 13/18 is movably mounted on a spool of a relay section, as will be described in the following description, and is in and out of contact with a fixed contact 13/12 by an electromagnetic force produced at the relay coil 13. The fixed contact 13/12 is connected to the L-terminal 10. A juncture 5 is connected to a terminal portion 4a of the printed circuit board 20. The letter L designates direction indicating lamps.

When the switch S is connected to either one of the lamps L, a main current flows from the battery to the lamp L through the B-terminal 9, the current detecting resistor R, the closed relay contacts 13/18 and 13/12 and the L-terminal 10. The relay contacts 13/18 and 13/12 are periodically closed and opened by the relay coil 13 so that the lamp L performs a flashing operation.

Figure 1:
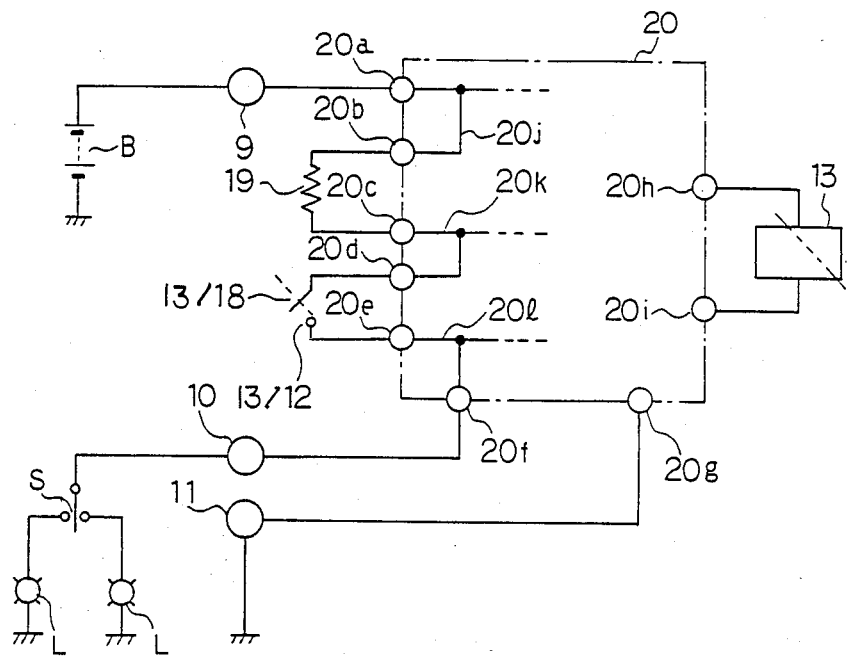
FIG. 1 is a schematic electric wiring diagram of a conventional flasher device for an automotive vehicle.
Figure 2:
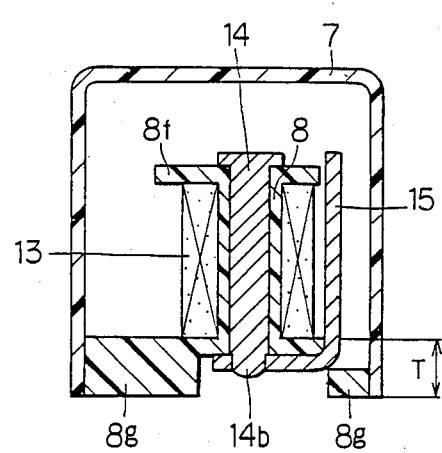
FIG. 2 is a schematic sectional view of the conventional flasher device.

As seen from the above operation, the main current does not flow through copper foils formed on the printed circuit board 20, so that the pattern space of the printed circuit board 20 can be made smaller. It should be also noted that the number of terminal portions 1a to 5a of the printed circuit board 20 are reduced when compared with those of the conventional device already explained and shown in FIG. 1.

Next a construction of the flasher device will be explained with reference to FIGS. 4 to 10.

Figure 4:
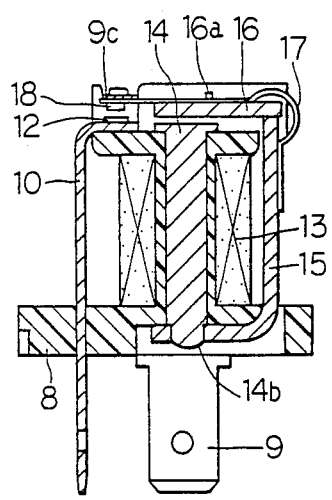
FIG. 4 is a sectional view of a relay section constituting a main part of the flasher device.
Figure 5:
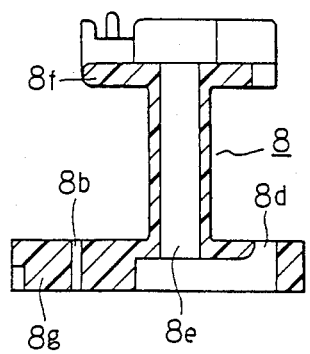
FIG. 5 is a sectional view of a spool of the relay section.
Figure 6:
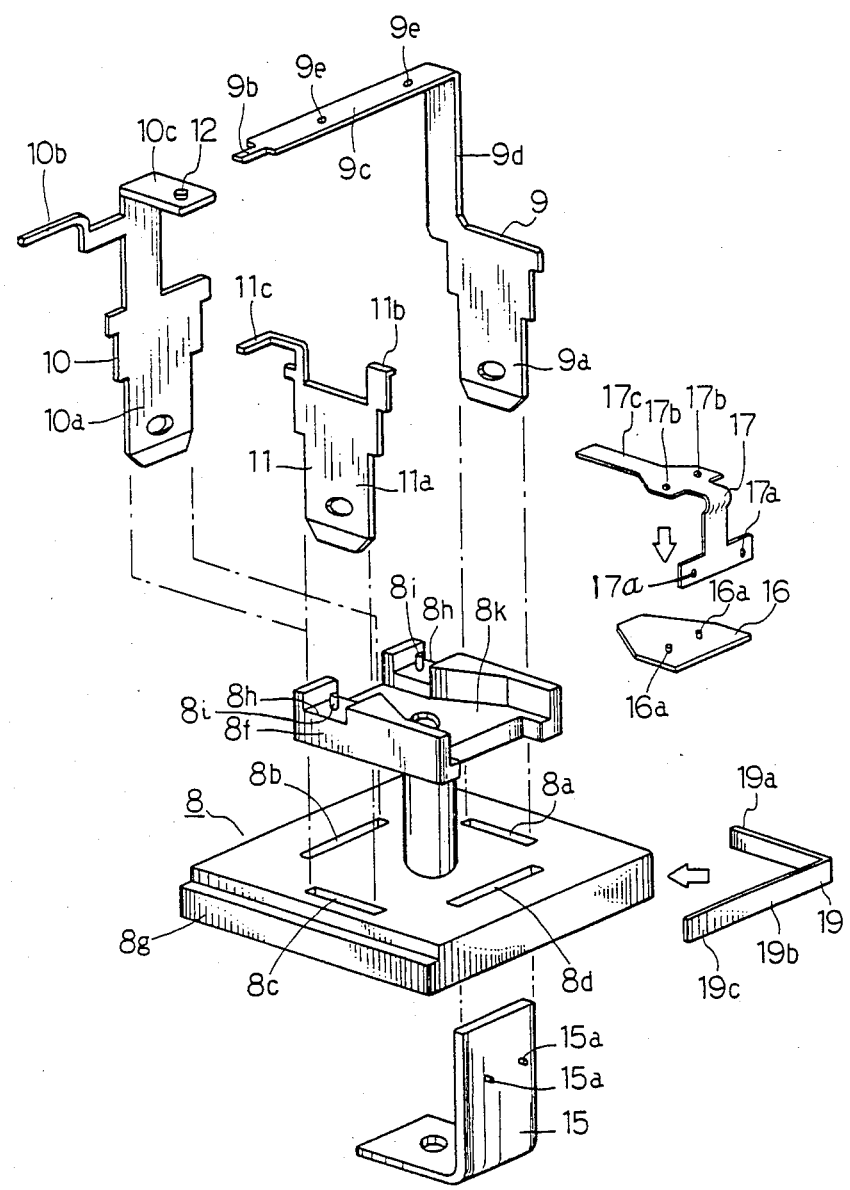
FIG. 6 is a perspective disassembled view of the relay section.
Figure 7:
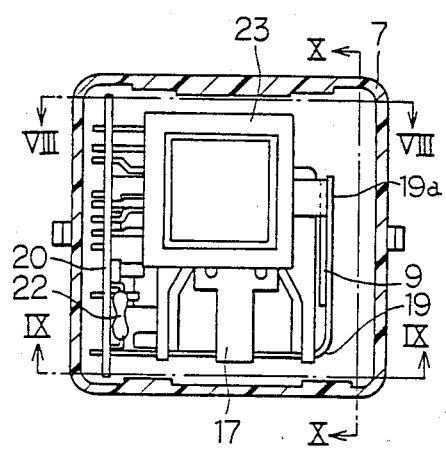
FIG. 7 is a sectional view of a flasher device according to the present invention taken along a line VII—VII in FIG. 6.
Figure 8:
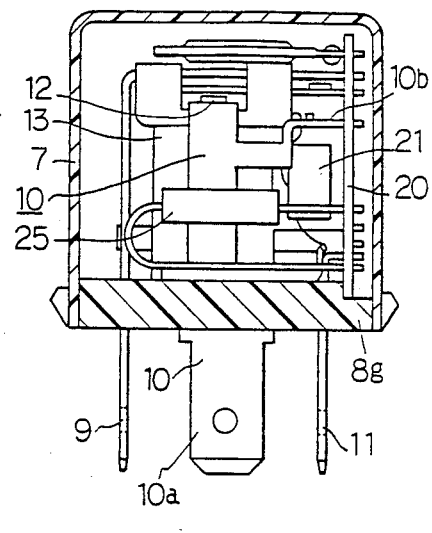
FIGS. 8 to 10 are sectional views taken along lines VIII—VIII, IX—IX and X—X in FIG. 7, respectively.
Figure 9:
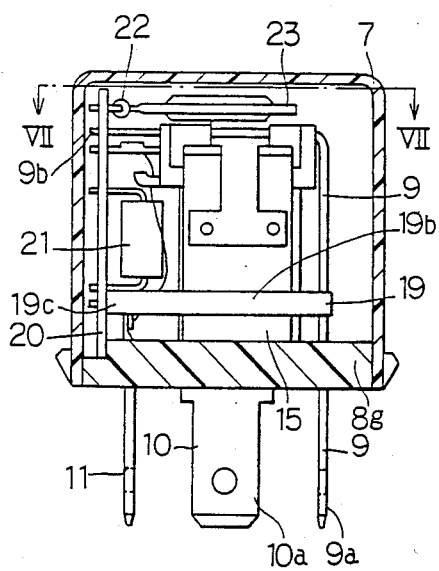
Figure 10:
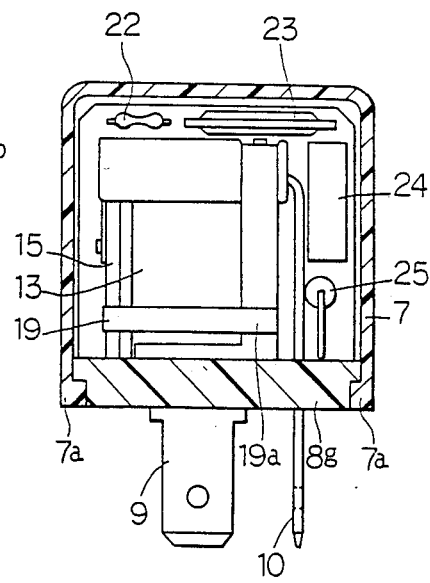

In FIGS. 4 to 6, which principally show a relay section of the flasher device, numeral 8 designates a spool made of synthetic resin and having an upper flange 8f and a lower flange 8g, in which there are formed four slits 8a to 8d into which the B-terminal 9, the L-terminal 10, the E-terminal 11 and a yoke 15 are respectively inserted in a direction parallel to an axial direction of the spool 8.

An iron core 14 is inserted into a central bore 8e of the spool 8 and fixed at its lower end 14b to the yoke 15. On a top surface of the upper flange 8f, a recess 8k is formed, within which an armature 16 is movably received. A pair of grooves 8h are further formed on the top surface, traversing and crossing over the recess, and a pair of projections 8i are integrally formed with the upper flange 8f within the grooves 8h, respectively.

Numeral 17 designates a leaf spring formed with two pairs of openings 17a and 17b. A pair of projections 15a are integrally formed with the yoke 15 and inserted into the pair of openings 17a so that the leaf spring 17 is fixed to the yoke 15. A pair of projections 16a are integrally formed with the armature 16 and inserted into the openings 17b so that the armature 16 is fixed to the leaf spring 17 and thereby swingably assembled to the yoke 15.

The B-terminal 9 is formed with a leg portion 9a extending through the slit 8a and projecting downwardly therefrom. An arm portion 9d extends upwardly and is bent at aright angle to extend horizontally, terminating at a tip portion 9b to be connected to a printed circuit board. In the horizontally extending arm portion, there are formed a pair of holes 9e into which the pair of projections 8i formed on the top surface of the upper flange 8f are inserted. After insertion, the top ends of the projections 8i are hot-pressed so that the arm portion is firmly fixed to the flange 8f of the spool 8.

A forward end 17c of the leaf spring 17, at which the movable contact 13/18 is attached, extends in the recess 8k and placed between the fixed contact 13/12 and the arm portion of the B-terminal 9, so that an arm portion 9c between the pair of holes 9e acts as a stopper for the leaf spring 17, namely the arm portion 9c limits an upward movement of the forward end 17c of the leaf spring 17.

The L-terminal 10 is formed with a leg portion 10a extending through the slit 8b and projecting downwardly therefrom. An arm portion 10c likewise extends upwardly and is bent at a right angle to extend horizontally. The bent arm 10c, on which the fixed contact 13/12 is attached, is received in the recess 8k of the upper flange 8f so that the fixed contact 13/12 is placed below the movable contact 13/18 attached to the leaf spring 17. A tongue portion 10b diverges from the arm portion 10c and extends horizontally to be connected to the printed circuit board.

The E-terminal 11 is likewise formed with a leg portion 11a extending through the slit 8c and projecting downwardly therefrom. The E-terminal 11 is further formed with a pair of forked ends 11b and 11c, wherein one end of a relay coil 13 wound on the spool 8 is electrically connected to the end 11b by fusing or soldering while the other end 11c is bent towards the printed circuit board so that it is connected thereto.

A band-like resistor element 19 is of a L-letter form and has one end 19a connected to the B-terminal 9 and the other end 19c connected to the printed circuit board. A middle portion 19b of the band-like element 19 is connected to the yoke 15, so that a portion of the element 19 between the one end 19a and middle portion 19b acts as a current detecting resistor R.

The current detecting resistor R may not be limitted to the band-like shape and therefore may be made of resistor wire having a round sectional configuration.

The whole construction of the flasher device, incorporating the above-described relay section, will be next explained with reference to FIGS. 7 to 10.

In FIGS. 7 to 10, numeral 7 designates a casing made of synthetic resin and its open end is closed by the lower flange 8g of the spool 8. The flange 8g is fixed to the casing 7 at a hook arrangement 7a to prevent water or dust from entering into the inside of the casing 7.

Numeral 20 designates a printed circuit board 20 attached to the lower flange 8g of the spool. Numerals 21 to 25 designate circuit elements respectively mounted on the printed circuit board 20. Numeral 21 is an IC electrically connected to the board 20 and disposed between the board 20 and the relay coil 13. The current detecting resistor R is arranged on an opposite side of the relay coil 13 with respect to the IC 21, so that heat generated at the resistor R will not influence the IC.

Numeral 23 is a flat aluminum electrolytic capacitor for determining a time constant of the flashing operation. The capacitor 23 is disposed between the top wall of the casing 7 and the relay section (above the relay coil 13), and has a thickness of 2 to 3 mm, so that the axial length of the flasher device can be minimized.

In stead of the flat aluminum electrolytic capacitor, other flat capacitors, such as a ceramic capacitor, a tantalum capacitor, a film capacitor or the like can also be used.

What is claimed is:

1. A flasher device for an automotive vehicle comprising:
   a casing;
   a spool made of synthetic resin and having a first flange and a second flange closing an open end of said casing;
   first to fourth slits formed in said second flange;
   a central bore formed in said spool;
   an iron core inserted into said central bore;
   a relay coil wound on said spool and between said first and second flanges;
   a printed circuit board enclosed in said casing;
   a yoke inserted into said fourth slit and extending upwardly, a lower end of said yoke being fixed to a lower end of said core;
   a B-terminal having a leg portion extending through said first slit and projecting downwardly therefrom, said B-terminal having an arm fixed to said first flange and an end of said arm being electrically connected to said printed circuit board;
   an L-terminal having a leg portion extending through said second slit and projecting downwardly therefrom, said L-terminal having an arm on which a fixed contact is attached, said L-terminal further having a tongue portion electrically connected to said printed circuit board;
   an E-terminal having a leg portion extending through said third slit and projecting downwardly therefrom, said E-terminal having a pair of forked ends, one of which is electrically connected to said printed circuit board and the other of which is connected to one end of said relay coil, the other end of said relay coil being connected to said printed circuit board;
   a leaf spring fixed to said yoke;
   an armature fixed to said leaf spring and placed above a top end of said iron core so that said armature is attracted to said iron core by an electromagnetic force produced by said relay coil;
   a movable contact fixed to a forward end of said leaf spring;
   said movable contact being positioned above said fixed contact so that when said armature is attracted to said iron core said movable contact becomes in contact with said fixed contact;
   a resistor element connected at its one end to said B-terminal, at its middle portion to said yoke and at its other end to said printed circuit board, so that a main lamp current flows from said B-terminal to said L-terminal through said resistor element, said movable contact and said fixed contact.

2. A flasher device as set forth in claim 1, further comprising:
   an IC mounted on said printed circuit board and disposed between said printed circuit board and said relay coil.

3. A flasher device as set forth in claim 1, further comprising;
   a flat capacitor mounted on said printed circuit board and disposed above said relay coil.

4. A flasher device as set forth in claim 1,
   wherein a portion of said resistor element between said one end and said middle portion acts as a current detecting resistor.

5. A flasher device as set forth in claim 4, wherein said current detecting resistor is disposed at an opposite side of said relay coil with respect to said IC.

6. A flasher device as set forth in claim 1,
   wherein said first flange includes:
   a recess for movably receiving therein said armature; and
   a pair of grooves for receiving a portion of said arm of said B-terminal.

7. A flasher device as set forth in claim 6,
   wherein said grooves cross over said recess.

8. A flasher device as set forth in claim 6,
   wherein said first flange further includes a pair of projections formed in said grooves, and
   wherein said B-terminal is formed with a pair of holes for receiving said pair of projections.

9. A flasher device as set forth in claim 6,
   wherein a portion of said arm received in said grooves is placed above said forward end of said leaf spring for acting as a stopper.

10. A flasher device as set forth in claim 6,
    wherein said arm of said L-terminal is received in said recess.

* * * * *